United States Patent
Hotta et al.

(10) Patent No.: US 7,957,234 B2
(45) Date of Patent: Jun. 7, 2011

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

(*) Notice: Subject to any disclaimer, the term of this patent is extended or adjusted under 35 U.S.C. 154(b) by 128 days.

(21) Appl. No.: 12/390,086

(22) Filed: Feb. 20, 2009

(65) Prior Publication Data
US 2009/0213706 A1 Aug. 27, 2009

(30) Foreign Application Priority Data
Feb. 22, 2008 (JP) ................. 2008-041169

(51) Int. Cl.
G11B 7/00 (2006.01)

(52) U.S. Cl. ............. 369/44.32; 369/44.34; 369/112.04; 369/112.23; 369/112.24

(58) Field of Classification Search .......... 369/112, 369/112.23, 112.24, 112.04, 44.34, 44.32
See application file for complete search history.

(56) References Cited

U.S. PATENT DOCUMENTS

| 6,859,429 | B2* | 2/2005 | Ogasawara et al. ....... 369/112.02 |
| 7,675,825 | B2* | 3/2010 | Ando .................... 369/44.32 |
| 2002/0172110 | A1* | 11/2002 | Tateishi et al. ............. 369/44.32 |
| 2004/0151088 | A1* | 8/2004 | Kuze et al. ................. 369/44.32 |
| 2006/0062103 | A1* | 3/2006 | Ogiwara et al. ........... 369/44.23 |
| 2007/0147216 | A1* | 6/2007 | Hirai ........................ 369/112.01 |
| 2009/0022035 | A1* | 1/2009 | Li et al. .................... 369/112.02 |

FOREIGN PATENT DOCUMENTS

JP 2006-147069 6/2006

* cited by examiner

*Primary Examiner* — Wayne R Young
*Assistant Examiner* — Linh T Nguyen
(74) *Attorney, Agent, or Firm* — Fish & Richardson P.C.

(57) ABSTRACT

An optical pickup apparatus comprising: a laser diode; an objective lens configured to focus laser light emitted from the laser diode on a signal recording layer of an optical disc; a first aberration correction element arranged in an optical path between the laser diode and the objective lens; and a second aberration correction element arranged in the optical path between the laser diode and the objective lens and having an aberration correction speed lower than the aberration correction speed of the first aberration correction element, the first aberration correction element and the second aberration correction element being selectively operated according to the required aberration correction speed.

6 Claims, 2 Drawing Sheets

OPTICAL PICKUP APPARATUS

CROSS-REFERENCE TO RELATED APPLICATION

This application claims the benefit of priority to Japanese Patent Application No. 2008-041169, filed Feb. 22, 2008, of which full contents are incorporated herein by reference.

BACKGROUND OF THE INVENTION

1. Field of the Invention

The present invention relates to an optical pickup apparatus that performs an operation of reading a signal recorded in an optical disc or an operation of recording a signal in the optical disc with laser light.

2. Description of the Related Art

An optical disc device has been widespread which can perform a signal reading operation and signal recording operation by applying laser light emitted from an optical pickup apparatus to a signal recording layer of the optical disc.

While the optical disc devices for optical discs called CD or DVD are available in general, there have recently been developed those for optical discs whose recording densities are improved, that is, optical discs of Blu-ray or HD DVD (High Density Digital Versatile Disc) standard.

Infrared light having a wavelength of 780 nm is used, as the laser light for performing the reading operation of a signal recorded in a CD standard optical disc, and red light having a wavelength of 650 nm is used as the laser light for performing the reading operation of a signal recorded in a DVD standard optical disc.

In contrast to such CD-standard and DVD-standard optical discs, laser light having a short wavelength such as blue-violet light having a wavelength of 405 nm is used as the laser light performing the reading operation of a signal recorded in the Blu-ray standard or HD DVD standard optical disc.

The thickness of the protective layer provided on the upper face of the signal recording layer of the Blu-ray standard optical disc is 0.1 mm, and the numerical aperture of the objective lens used for the reading operation of a signal from the signal recording layer is specified at 0.85.

On the other hand, the thickness of the protective layer provided on the upper face of the signal recording layer of the HD DVD standard optical disc is 0.6 mm, and the numerical aperture of the objective lens used for the reading operation of a signal from the signal recording layer is specified at 0.65.

For such an optical pickup apparatus compliant with the optical disc standard with improved recording density, the optical characteristics required in order to improve signal recording quality have become rigorous in response to the improvement of the recording density.

The optical pickup apparatus is configured such that a driving current supplied to a laser diode can be controlled so as to obtain a laser output suitable for reading a signal recorded in the optical disc or recording of a signal into the optical disc.

Also, the optical pickup apparatus is configured such that a focusing control operation can be performed, which is a control operation of controlling a spot of the laser light applied from the optical pickup apparatus so as to be focused on a signal recording layer of the optical disc and a tracking control operation can be performed, which is a control operation of controlling the spot of the laser light so as to follow a signal track.

In the optical disc device, the optical disc is placed on a turntable, which is driven to be rotated by a spindle motor, and is driven to be rotated, however, inclination caused by warping of the optical disc itself, a state of the optical disc placed on the turntable or a mechanical error, may occur in the optical disc. If the optical disc is inclined, inclination of an optical axis of the laser light relative to a signal surface of the optical disc is deviated from an optimal state.

With the increase in the density of signals recorded in the optical disc, the above-mentioned deviation of the optical axis of the laser light relative to the signal surface of the optical disc becomes a significant problem, and thus, there has recently been developed the optical pickup apparatus having a function capable of performing a so-called tilt control operation, that is, an operation of adjusting the inclination of the optical axis of the laser light relative to the signal surface of the optical disc.

In the optical pickup apparatus, an aberration called a spherical aberration or coma aberration occurs, which is caused by a thickness of a protective layer between a laser light incident surface and a signal recording layer of the optical disc and the like, so that operations of reproducing a signal or recording a signal can not be performed normally, and thus, an art for solving such a problem has been developed (See Japanese Patent Laid-Open Publication No. 2006-147069.)

In recent optical discs, there has been introduced a multi-layer optical disc in which a plurality of signal recording layers are provided in order to increase signal recording capacity.

The above-mentioned patent document describes an art relating to an optical pickup apparatus capable of correcting the spherical aberration or coma aberration. However, it is not assumed in the multi-layer optical disc, for example, that a correction operation is performed to a great change in the spherical aberration with an instantaneous change in the thickness of the protective layer when an operation is performed of jumping between the signal recording layers, and thus, there is a problem that an aberration correction operation can not be performed corresponding to the instantaneous change.

SUMMARY OF THE INVENTION

An optical pickup apparatus according to an aspect of the present invention, comprises: a laser diode; an objective lens configured to focus laser light emitted from the laser diode on a signal recording layer of an optical disc; a first aberration correction element arranged in an optical path between the laser diode and the objective lens; and a second aberration correction element arranged in the optical path between the laser diode and the objective lens and having an aberration correction speed lower than the aberration correction speed of the first aberration correction element, the first aberration correction element and the second aberration correction element being selectively operated according to the required aberration correction speed.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
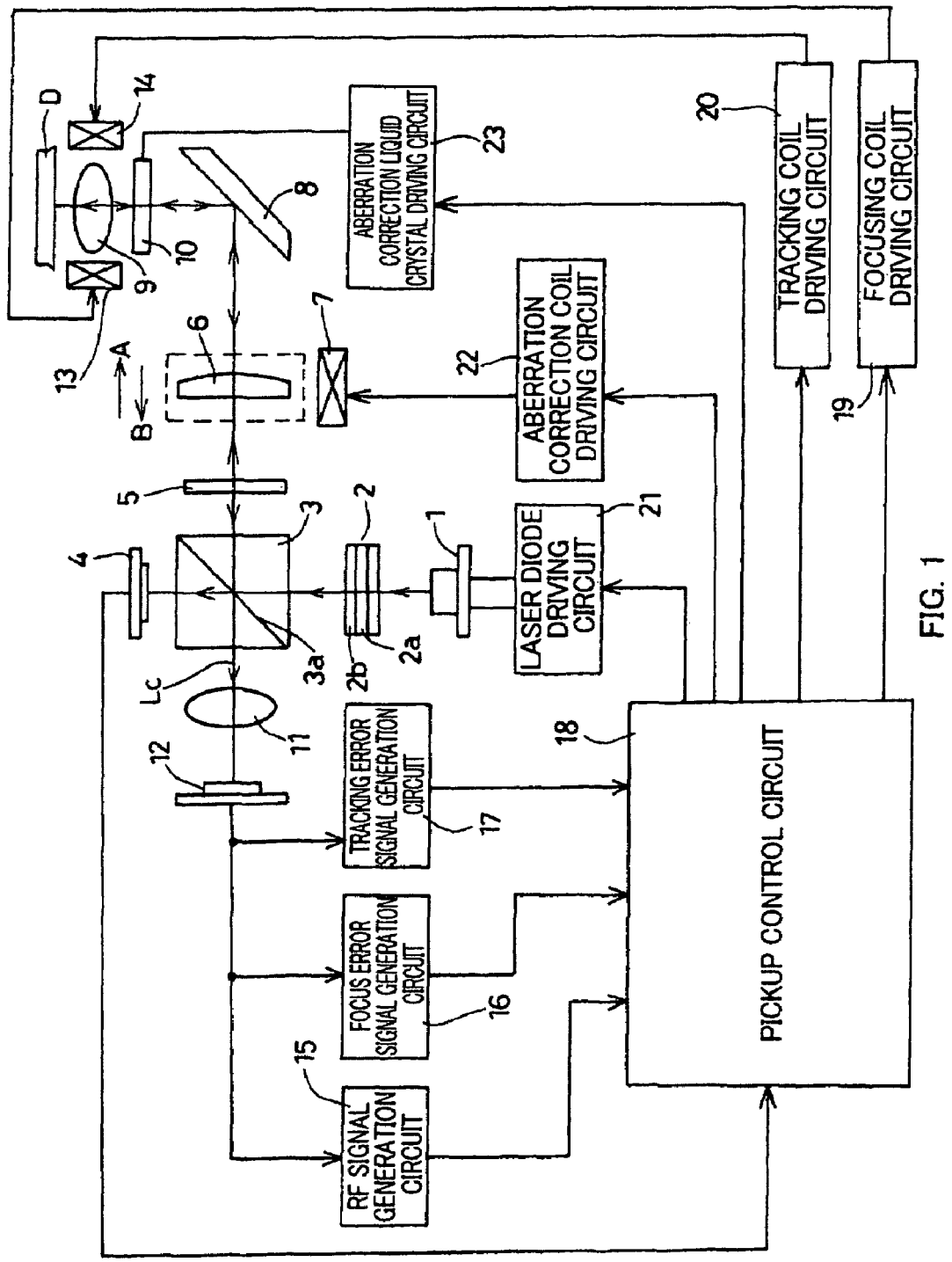
FIG. 1 is a diagram for explaining an operation of an optical pickup apparatus according to an embodiment of the present invention.

At least the following details will become apparent from descriptions of this specification and of the accompanying drawings.

In the optical pickup apparatus according to an embodiment of the present invention, a first aberration correcting element with a faster aberration correction speed and a second aberration correcting element with an aberration correction speed slower than that of the first aberration correcting element are provided in an optical path between a laser diode and an objective lens, and an aberration correction operation is performed by the first aberration correcting element when a faster aberration correction operation is required.

In the optical pickup apparatus according to an embodiment of the present invention, the aberration correction operation is performed by the second aberration correcting element when the faster aberration correction operation is not required.

In the optical pickup apparatus according to an embodiment of the present invention, a collimating lens is used as the first aberration correcting element, and an aberration is corrected by moving the collimating lens in an optical axis direction.

In the optical pickup apparatus according to an embodiment of the present invention, a spherical aberration is corrected by a displacement operation of the collimating lens in the optical axis direction.

In the optical pickup apparatus according to an embodiment of the present invention, a liquid crystal control element is used as the second aberration correcting element, and an electrode pattern of the liquid crystal control element is changed to correct the aberration.

In the optical pickup apparatus according to an embodiment of the present invention, at least one of coma aberration, astigmatism and spherical aberration is corrected by an operation of changing the electrode pattern of the liquid crystal control element.

In the optical pickup apparatus according to an embodiment of the present invention, the first aberration correcting element with the faster aberration correction speed and the second aberration correcting element with the aberration correction speed slower than that of the first aberration correcting element are provided in the optical path between the laser diode and the objective lens, and the aberration correction operation is performed by the first aberration correcting element when an operation of jumping is performed between signal recording layers included in a multi-layer optical disc.

In the optical pickup apparatus according to an embodiment of the present invention, the first aberration correcting element with the faster aberration correction speed and the second aberration correcting element with the aberration correction speed slower than the first aberration correcting element are provided in the optical path between the laser diode and the objective lens, and the coma aberration caused by inclination of the optical disc is corrected by the second aberration correcting element.

In the optical pickup apparatus according to an embodiment of the present invention, the first aberration correcting element with the faster aberration correction speed and the second aberration correcting element with the aberration correction speed slower than the first aberration correcting element are provided in the optical path between the laser diode and the objective lens, the aberration correction operation is performed by the first aberration correcting element when the faster aberration correction operation is required, and the aberration correction operation is performed by the second aberration correcting element when the faster aberration correction operation is not required, that is, the aberration correction operation corresponding to required aberration correction can be performed. Therefore, according to an embodiment of the present invention, since the aberration correcting element can be designed which is suitable for use in correction of a target aberration to be corrected, the characteristics of the optical pickup apparatus can be improved.

In FIG. 1, reference numeral 1 denotes a laser diode for emitting laser light, which is a blue-violet light having a wavelength of 405 nm, for example. Reference numeral 2 denotes a diffraction grating that the laser light emitted from the laser diode 1 enters, and that includes: a diffraction grating portion 2a for dividing the laser light into a main beam, which is 0th order light, and two sub beams, which are +1st order diffraction light and −1st order diffraction light; and a half-wave plate 2b for converting the incident laser light into linearly polarized light in an S direction.

Reference numeral 3 denotes a polarizing beam splitter that the laser light having passed through the diffraction grating 2 enters, and that includes a control film 3a for reflecting most of S-polarized laser light and allowing the laser light polarized in a P direction to pass therethrough. Reference numeral 4 is a monitor photodetector provided at a position where the laser light having passed through the control film 3a of the polarizing beam splitter 3 in the laser light emitted from the laser diode 1 is applied, and an output obtained by detection with the monitor photodetector is used for controlling an output of the laser light emitted from the laser diode 1.

Reference numeral 5 denotes a quarter-wave plate that is provided at a position where the laser light reflected by the control film 3a of the polarizing beam splitter 3 is incident, and that converts the incident laser light from the linearly polarized light into circular polarized light, or vice versa, i.e., from the circular polarized light to the linearly polarized light. Reference numeral 6 denotes a collimating lens that the laser light having passed through the quarter-wave plate 5 enters, that converts the incident laser light into parallel light, and that is moved by a collimating lens driving coil 7 in the optical axis direction, i.e., in directions of arrows A and B. The spherical aberration caused according to the thickness of the protective layer of an optical disc D is corrected by the movement operation of the collimating lens 6 in the optical axis direction.

Reference numeral 8 is a raising mirror that is provided at a position where the laser light having passed through the collimating lens 6 is incident on and the incident laser light is reflected in a direction of an objective lens 9. Reference numeral 10 denotes a liquid crystal control element that is provided between the raising mirror 8 and the objective lens 9, and the electrode pattern for correcting the coma aberration, astigmatism or spherical aberration is included therein.

In such a configuration, the laser light emitted from the laser diode 1 is made incident on the objective lens 9 through the diffraction grating 2, the polarizing beam splitter 3, the quarter-wave plate 5, the collimating lens 6, the raising mirror 8, and the liquid crystal control element 10, to be applied as a spot to a signal recording layer, i.e., a signal recording surface of the signal recording layer, of the optical disc D by a focusing operation with the objective lens 9, and the laser light applied to the signal recording layer is reflected as return light.

The return light reflected from the signal recording layer of the optical disc D is made incident-on the control film 3a of the polarizing beam splitter 3 through the objective lens 9, the liquid crystal control element 10, the raising mirror 8, the collimating lens 6, and the quarter-wave plate 5. The return light incident on the control film 3a of the polarizing beam splitter 3 as above has been changed into the linearly polarized light in the P direction by a phase change operation with the quarter-wave plate 5. Therefore, such return light is not reflected by the control film 3a but is passed therethrough as control laser light Lc.

Reference numeral 11 is a sensor lens that the control laser light Lc having passed through the control film 3a of the polarizing beam splitter 3 is incident on and condenses the control laser light Lc to be applied to a light receiving portion provided at a photodetector 12 called PDIC. The photodetector 12 includes a four-divided sensor and performs a signal generation operation with an operation of reading a signal recorded in the signal recording layer of the optical disc D by an operation of applying the main beam, a signal generation operation for performing the focusing control operation by astigmatic method, and a signal generation operation for performing the tracking control operation by an operation of applying the two sub beams.

The optical pickup apparatus according to an embodiment of the present invention is configured as mentioned above, and in such a configuration, the objective lens 9 is fixed to a lens holding frame (not shown) that is supported with four or six support wires on a base of the optical pickup apparatus so as to be able to perform a movement operation in a perpendicular direction relative to the signal surface of the optical disc D, i.e., a focusing direction, and in a radial direction of the optical disc D, i.e., a tracking direction.

Reference numeral 13 is a focusing coil that is provided at the lens holding frame to which the objective lens 9 is fixed and that moves the objective lens 9 in the focusing direction in concert with a magnet fixed to the base. Reference numeral 14 is a tracking coil that is provided at a support frame to which the objective lens 9 is fixed and that moves the objective lens 9 in the tracking direction in concert with the magnet fixed to the base.

The optical pickup apparatus according to an embodiment of the present invention incorporates a tilt adjustment function that can adjust an angle of the optical axis of the objective lens 9 relative to the signal surface of the optical disc D, and includes a tilt coil for adjusting tilt, though not shown.

Reference numeral 15 is an RF signal generation circuit that generates an RF signal that is a signal obtained from a sensor, which makes up the photodetector 12, for receiving the main beam, with performing the operation of reading a signal recorded in the signal recording layer of the optical disc D. Reference numeral 16 denotes a focus error signal generation circuit that generates a focus error signal, which is a signal obtained from the sensor for receiving the main beam. Reference numeral 17 is a tracking error signal generation circuit that generates a tracking error signal, which is a signal obtained from a sensor for receiving the sub beam.

Reference numeral 18 is a pickup control circuit that performs various control operations of the optical pickup apparatus based on signals obtained from the monitor photodetector 4, the RF signal generation circuit 15, the focus error signal generation circuit 16, and the tracking error signal generation circuit 17 and the like. Reference numeral 19 is a focusing coil driving circuit that a focus control signal is input to and that supplies a driving signal to the focusing coil 13. The focus control signal is output from the pickup control circuit 18 based on a focus error signal generated in and input from the focus error signal generation circuit 16. Reference numeral 20 is a tracking coil driving circuit that a tracking control signal is input to and that supplies a driving signal to the tracking coil 14. The tracking control signal is output from the pickup control circuit 18 based on a tracking error signal generated in and input from the tracking error signal generation circuit 17.

Reference numeral 21 is a laser diode driving circuit that supplies a driving signal to the laser diode 1 and is configured so as to adjust the laser output by a control signal output from the pickup control circuit 18 based on a monitor signal obtained from the monitor photodetector 4. Reference numeral 22 is an aberration correction coil driving circuit that supplies a driving signal to the collimating lens driving coil 7 to correct the spherical aberration by moving a movement position of the collimating lens 6 in the optical axis direction to be adjusted, and that is configured to be controlled by the pickup control circuit 18.

Reference numeral 23 is an aberration correction liquid crystal driving circuit that supplies a driving signal to the electrode pattern provided at the liquid crystal control element 10 and that is configured to selectively change the electrode pattern provided for correcting the coma aberration, astigmatism or spherical aberration based on a control signal output from the pickup control circuit 18.

The first aberration correcting element for correcting the spherical aberration by moving the collimating lens 6 has characteristics that the correction speed thereof is faster than that of the second aberration correcting element for correcting the coma aberration, astigmatism or spherical aberration by controlling the pattern electrode of the liquid crystal control element.

In such a configuration, if a multi-layer optical disc including a plurality of signal recording layers is used as the optical disc D, since a fast aberration correction operation is required when the operation of jumping between the signal recording layers is performed, setting is made utilizing the movement operation of the collimating lens 6 provided as the first aberration correcting element, while in a case of the aberration correction operation in a state where the signal reading operation is performed, that is, in a case where the fast aberration correction operation is not required, setting is made utilizing an operation of changing the electrode pattern with the liquid crystal control element 10 provided as the second aberration correcting element.

While the optical pickup apparatus according to an embodiment of the present invention is configured as mentioned above, an operation thereof will be described below.

Figure 2A:
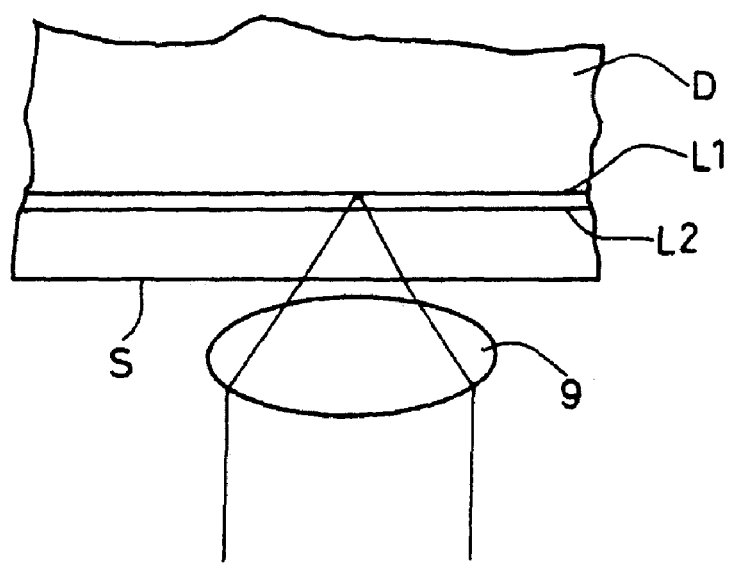
FIG. 2 is a diagram illustrating a relationship between laser light and an optical disc in an optical pickup apparatus according to an embodiment of the present invention.
Figure 2B:
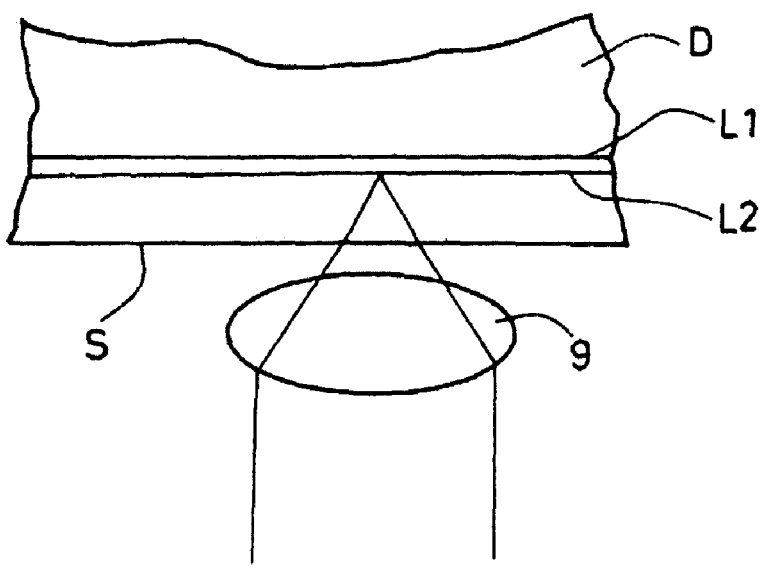

FIGS. 2A and 2B show a relationship between a double-layer optical disc D and laser light, and as shown in the figures, a first signal recording layer L1 and a second signal recording layer L2 are provided. FIG. 2A shows a state in which an operation of reading a signal recorded in the first signal recording layer L1 is performed, while FIG. 2B shows a state in which an operation of reading a signal recorded in the second signal recording layer L2 is performed.

When the operation of reading a signal recorded in the first signal recording layer L1 is performed, a driving control signal is supplied from the pickup control circuit 18 to circuits making the optical pickup apparatus. A driving signal for obtaining a laser output set in advance for the laser diode 1 is supplied from the laser diode driving circuit 21, and the laser light with a desired output is emitted from the laser diode 1.

The laser light emitted from the laser diode 1 enters the diffraction grating 2, to be divided by the diffraction grating portion 2a included in the diffraction grating 2 into a main beam and sub beams, and converted by the half-wave plate 2b into a linearly polarized light in the S direction. The laser light having passed through the diffraction grating 2 enters the polarizing beam splitter 3, and most of the laser light is reflected by the control film 3*a* included in the polarizing beam splitter 3, while a part of the laser light passes through the control film 3*a*.

Since the laser light having passed through the control film 3*a* is applied to the monitor photodetector 4, a signal according to a level of the applied laser light is input to the pickup control circuit 18 as a monitor signal. When such a monitor signal is input, a control signal based on a level of a monitor signal is supplied from the pickup control circuit 18 to the laser diode driving circuit 21. Therefore, if a configuration is made such that a level of a driving signal to be supplied from the pickup control circuit 18 to the laser diode driving circuit 21 is controlled to be at a predetermined value, the output of the laser light emitted from the laser diode 1 can be automatically controlled to be at the desired level.

The laser light reflected by the control film 3*a* included in the polarizing beam splitter 3 enters the quarter-wave plate 5, to be converted from the linearly polarized light into the circular polarized light, and then, the converted light enters the collimating lens 6. The laser light having been incident on the collimating lens 6 is converted into the parallel light to enter the raising mirror 8.

The laser light having been incident on the raising mirror 8 is reflected by the raising mirror 8, and then, the reflected light enters the objective lens' 9 through the liquid crystal control element 10. Since the laser light enters the objective lens 9 through the above-mentioned optical path, the focusing operation with the objective lens 9 is performed.

The focusing operation to the first signal recording layer L1 with the objective lens 9 is performed by an operation of moving the objective lens 9 closer from a position away from the optical disc D, for example. When such an operation is performed, a focus error signal obtained from the second signal recording layer L2 and a focus error signal obtained from the first signal recording layer L1 can be detected. Accordingly, by discriminating between focus error signals obtained as above, the first signal recording layer L1 and the second signal recording layer L2 can be discriminated.

The above-mentioned movement operation of the objective lens 9 is performed by supplying a driving signal from the focusing coil driving circuit 19 to the focusing coil 13, and FIG. 2A shows a state where the focusing operation is performed with the objective lens 9 to the first signal recording layer L1. When the focusing operation is performed to the first signal recording layer L1, the laser light reflected from the first signal recording layer L1 enters the objective lens 9 from the side of the optical disc D as the return light.

The return light having been incident on the objective lens 9 enters the control film 3*a* included in the polarizing beam splitter 3 through the liquid crystal control element 10, the raising mirror 8, the collimating lens 6, and the quarter-wave plate 5. Since the return light having been incident on the control film 3*a* has been converted by the quarter-wave plate 5 into the linearly polarized light in the P direction, the return light is not reflected by the control film 3*a* but all of the light passes therethrough as the control laser light Lc.

The control laser light Lc, which is the return light having passed through the control film 3*a*, enters the sensor lens 11, to be applied to the photodetector 12 with astigmatism added to the light by the sensor lens 11. As the result of irradiating the photodetector 12 with the control laser light Lc, a detection signal based on positions and form changes of irradiation spots of the main beam and the sub beams can be obtained from the four-divided sensor included in the photodetector 12.

In such a state, a focus error signal generated from the focus error signal generation circuit 16 and a tracking error signal generated from the tracking error signal generation circuit 17 based on a detection signal obtained from the photodetector 12 are input to the pickup control circuit 18. When such a focus error signal and a tracking error signal are input to the pickup control circuit 18, a control signal based on each error signal is output to the focusing coil driving circuit 19 and the tracking coil driving circuit 20. As a result, a control signal is supplied from the focusing coil driving circuit 19 to the focusing coil 13, and thus, the movement operation of the objective lens 9 is performed by the focusing coil 13 in the focusing direction, so that the focusing control operation for focusing the laser light can be performed to the first signal recording layer L1. Since a control signal is supplied from the tracking coil driving circuit 20 to the tracking coil 14, the movement operation of the objective lens 9 is performed by the tracking coil 14 in the tracking direction, so that the tracking control operation can be performed of making the laser light follow the signal track provided on the first signal recording layer L1.

Since the focusing control operation and the tracking control operation are performed in the optical pickup apparatus as mentioned above, the operation can be performed of reading a signal recorded in the first signal recording layer L1 of the optical disc D. A reproduction signal obtained through such a reading operation can be obtained as information data by demodulating, as known, an RF signal generated from the RF signal generation circuit 15.

The operation is performed of reading a signal recorded in the signal recording layer L1 as above, and in a state where such a reading operation is performed, the collimating lens 6 provided as the first aberration correcting element is moved to a first operational position at which the spherical aberration with respect to the first signal recording layer L1 is minimized, by a driving signal supplied from the aberration correction coil driving circuit 22 to the collimating lens driving coil 7. Such a first operational position may be set at a position where a value of jitter included in a reproduction signal is an optimal value or a level of an RF signal is maximum, for example.

By performing the above-mentioned setting operation, the spherical aberration can be minimized which occurs at a spot of the laser light incident on the objective lens 9 to be applied to the first signal recording layer L1 of the optical disc D, however, the coma aberration is caused by the movement of the objective lens 9 in the radial direction. The coma aberration caused as above can be corrected by supplying a control signal from the aberration correction liquid crystal driving circuit 23 to the liquid crystal control element 10 provided as the second aberration correcting element and by selecting and controlling the electrode pattern included in the liquid crystal control element 10.

By performing an operation of moving the collimating lens 6 to the first operational position and the selection and control operation of the electrode pattern included in the liquid crystal control element 10 as mentioned above, the operation of reading a signal recorded in the first signal recording layer L1 included in the optical disc D can be performed in the optimal state.

The operation of reading a signal recorded in the first signal recording layer L1 is performed as mentioned above, and the case of the operation of reading a signal recorded in the second signal recording layer L2 will be described next.

Such an operation is performed similarly to the focusing operation with the objective lens 9 to the first signal recording layer L1. That is, the focusing operation with the objective lens 9 to the second signal recording layer L2 is performed by an operation of moving the objective lens 9 closer from a position away from the optical disc D, for example. When such an operation is performed, a focus error signal obtained from the second signal recording layer L2 and a focus error signal obtained from the first signal recording layer L1 can be detected. Accordingly, by discriminating between focus error signals obtained as above, the first signal recording layer L1 and the second signal recording layer L2 can be discriminated.

The above-mentioned movement operation of the objective lens 9 is performed by supplying a driving signal from the focusing coil driving circuit 19 to the focusing coil 13, and FIG. 2B shows a state where the focusing operation is performed with the objective lens 9 to the second signal recording layer L2.

When the focusing operation is performed by the objective lens 9 to the second signal recording layer L2, the laser light reflected from the second signal recording layer L2 enters the objective lens 9 from the side of the optical disc D as the return light.

When the focusing operation of the laser light is performed with the objective lens 9 onto the second signal recording layer L2, the control operation is performed by the pickup control circuit 18 for reading a signal recorded in the second signal recording layer L2, as in the case of the above-mentioned control operation for the first signal recording layer L1, and thus, the description will be omitted.

In a state where the operation is performed of reading a signal recorded in the second signal recording layer L2, the collimating lens 6 is moved with a driving signal supplied from the aberration correction coil driving circuit 22 to the collimating lens driving coil 7 to a second operational position at which the spherical aberration with respect to the second signal recording layer L2 is minimized. Such a second operational position may be also set at a position where a jitter value included in a reproduction signal is an optimal value or a level of an RF signal is maximum, for example.

By performing the above-mentioned setting operation, the spherical aberration can be minimized which occurs at a spot of the laser light incident on the objective lens 9 to be applied to the second signal recording layer L2 of the optical disc D, however, the coma aberration is caused by the movement of the objective lens 9 in the radial direction also in the case of the operation of reading a signal with respect to the second signal recording layer L2. The coma aberration caused as above can also be corrected by supplying a control signal from the aberration correction liquid crystal driving circuit 23 to the liquid crystal control element 10 provided as the second aberration correcting element and by selecting and controlling the electrode pattern included in the liquid crystal control element 10.

By performing an operation of moving the collimating lens 6 to the second operational position and the selection and control operation of the electrode pattern included in the liquid crystal control element 10 as mentioned above, the operation of reading a signal recorded in the second signal recording layer L2 included in the optical disc D can be performed in the optimal state.

Operations are performed of controlling the collimating lens 6, which is the first aberration correcting element, and the liquid crystal control element 10 when the operations are performed of reading signals recorded in the first signal recording layer L1 and the second signal recording layer L2 as mentioned above, and an operation of selecting the aberration correcting element will be described next, which is the gist of an embodiment of the present invention.

In a state where the operations are performed of reading signals recorded in the first signal recording layer L1 and the second signal recording layer L2, when the fast aberration correction operation is not required, for example, in the case of coma aberration, astigmatism, and spherical aberration caused by tracking deviation or tilt deviation, the aberrations are corrected by performing the operation of controlling the liquid crystal control element 10, which is the second aberration correcting element.

Such an aberration correction operation is also performed similarly when using a single layer optical disc including one signal recording layer. When the fast aberration correction operation is not required as above, the aberrations are corrected by the aberration correction operation with the use of the liquid crystal control element 10.

Next, an operation to be performed when the fast aberration correction operation is required will be described. Such an operation which requires the fast aberration correction operation can be, for example, an operation of switching from a state where the operation of reading a signal recorded in the first signal recording layer L1 to a state where the operation of reading a signal recorded in the second signal recording layer L2, that is, an operation of jumping between the signal recording layers.

When performing such an operation of jumping between the signal recording layers, for example, an operation of jumping from the first signal recording layer L1 to the second signal recording layer L2, a thickness of the protective layer, which is a layer between a signal recording layer and a disc surface S that the laser light enters, is greatly changed instantaneously, as is obvious from FIGS. 2A and 2B. The above jump operation is performed by instantaneously moving the objective lens 9 in a direction away from the disc surface S, however, when such an operation is performed, the spherical aberration is greatly changed in a short time along with change in the thickness of the protective layer.

When the operation of jumping between the signal recording layers is performed as above, the spherical aberration is greatly changed instantaneously, however, an embodiment of the present invention is configured so as to perform an operation of correcting the spherical aberration by performing an operation of moving the collimating lens 6, which is the first aberration correcting element capable of performing the fast aberration correction operation, from the first operational position to the second operational position. Since the operation of correcting the spherical aberration can be quickly performed by performing such an operation, the operation can be quickly started of reading a signal from the second signal recording layer L2 with the operation of jumping from the first signal recording layer L1 to the second signal recording layer L2.

While the aberration correction operation when the operation of jumping from the first signal recording layer L1 to the second signal recording layer L2 is performed as mentioned above, the aberration correction operation is also performed similarly in an operation of jumping from the second signal recording layer L2 to the first signal recording layer L1, and thus, the description will be omitted.

The operation is described of jumping between the signal recording layers in a case where the fast aberration correction operation is required, as above, however, an embodiment of the present invention can be also applied to other operations such as an operation of moving at high speed to a position where desired data is recorded, which is a so-called search operation.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
   a laser diode;
   an objective lens configured to focus laser light emitted from the laser diode on multiple signal recording layers of an optical disc;
   a first aberration correction element arranged in an optical path between the laser diode and the objective lens; and
   a second aberration correction element arranged in the optical path between the laser diode and the objective lens and having an aberration correction speed lower than the aberration correction speed of the first aberration correction element,
   the first aberration correction element and the second aberration correction element being selectively operated according to the required aberration correction speed,
   the first aberration correction element operating so as to correct aberration, when jumping between one of the signal recording layers and another of the signal recording layer of the optical disc,
   the second aberration correction element operating so as to correct aberration, when reading a signal from one of the signal recording layers of the optical disc.

2. The optical pickup apparatus according to claim 1, wherein
   the first aberration correction element includes a collimating lens movable in an optical axis direction so as to correct aberration.

3. The optical pickup apparatus according to claim 2, wherein
   the first aberration correction element corrects spherical aberration.

4. The optical pickup apparatus according to claim 1, wherein
   the second aberration correction element includes a liquid crystal control element having an electrode pattern for correcting aberration.

5. The optical pickup apparatus according to claim 4, wherein
   the second aberration correction element corrects at least one of coma aberration, astigmatism, and spherical aberration.

6. The optical pickup apparatus according to claim 4, wherein
   the second aberration correction element is arranged in an optical path between the first aberration correction element and the objective lens.

* * * * *

UNITED STATES PATENT AND TRADEMARK OFFICE
CERTIFICATE OF CORRECTION

PATENT NO. : 7,957,234 B2
APPLICATION NO. : 12/390086
DATED : June 7, 2011
INVENTOR(S) : Tohru Hotta and Ryoichi Kawasaki It is certified that error appears in the above-identified patent and that said Letters Patent is hereby corrected as shown below:

Column 11, Line 29 (Claim 1), please delete "layer" and insert --layers--, therefor.

Signed and Sealed this
Twenty-sixth Day of July, 2011

David J. Kappos
*Director of the United States Patent and Trademark Office*